US011416910B1

(12) United States Patent
Bazzani et al.

(10) Patent No.: US 11,416,910 B1
(45) Date of Patent: Aug. 16, 2022

(54) VISUAL BLENDING OF CONTENT

(71) Applicant: Amazon Technologies, Inc., Seattle, WA (US)

(72) Inventors: Loris Bazzani, Berlin (DE); Filip Saina, Berlin (DE); Amaia Salvador Aguilera, Berlin (DE); Angel Noe Martinez Gonzalez, Berlin (DE); Eleonora Vig, Munich (DE); Erhan Gundogdu, Berlin (DE); Michael Donoser, Berlin (DE)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 39 days.

(21) Appl. No.: 17/034,294

(22) Filed: Sep. 28, 2020

(51) Int. Cl.
*G06F 16/26* (2019.01)
*G06F 3/04842* (2022.01)
*G06Q 30/06* (2012.01)
*G06F 3/0483* (2013.01)
*G06N 3/04* (2006.01)
*G06N 3/08* (2006.01)

(52) U.S. Cl.
CPC ....... *G06Q 30/0631* (2013.01); *G06F 3/0483* (2013.01); *G06F 3/04842* (2013.01); *G06F 16/26* (2019.01); *G06N 3/04* (2013.01); *G06N 3/08* (2013.01); *G06Q 30/0623* (2013.01); *G06Q 30/0643* (2013.01); *G06Q 30/0603* (2013.01); *G06Q 30/0633* (2013.01)

(58) Field of Classification Search
CPC ...... G06F 3/0482; G06F 16/248; G06F 16/26; G06F 16/90328; G06F 16/9038; G06F 16/904; G06F 3/0483; G06F 3/04842; G06Q 30/0631; G06Q 30/0623; G06Q 30/0643

See application file for complete search history.

(56) References Cited

U.S. PATENT DOCUMENTS

| | | | |
|---|---|---|---|
| 2010/0049707 A1* | 2/2010 | Faria | G06F 16/58 707/749 |
| 2012/0143857 A1* | 6/2012 | Gronow | G06F 16/532 707/723 |

OTHER PUBLICATIONS

Ivona Tautkute et al., Deep Style: Multimodal Search Engine for Fashion and Interior Design, Jan. 1, 2019, IEEE Access, vol. 7, pp. 84613-84628 (Year: 2019).*

(Continued)

*Primary Examiner* — Tam T Tran
(74) *Attorney, Agent, or Firm* — K&L Gates LLP

(57) ABSTRACT

Systems and techniques are generally described for generating visually blended recommendation grids. In some examples, a selection of a first item and a second item displayed on a display may be received. In various examples, the first item may be displayed in a first element of a grid and the second item may be displayed in a second element of the grid. In some examples, a third element of the grid that is disposed between the first element and the second element along an axis of the grid may be determined. In various examples, a third item may be determined for display in the third element of the grid based at least in part on a blended representation of an embedding of the first item and an embedding of the second item. The third item may be displayed in the third element of the grid.

20 Claims, 8 Drawing Sheets

(56) References Cited

OTHER PUBLICATIONS

Lyn Bartram et al., Whisper—Don't Scream: Grids and Transparency, Nov. 9, 2010, IEEE Transactions on Visualization and Computer Graphics, vol. 17, No. 10, pp. 1444-1457 (Year: 2010).*
Zhao et al.; A Weakly Supervised Adaptive Triplet Loss for Deep Metric Learning; Sep. 27, 2019; 4 Pgs; Cornell University.

* cited by examiner

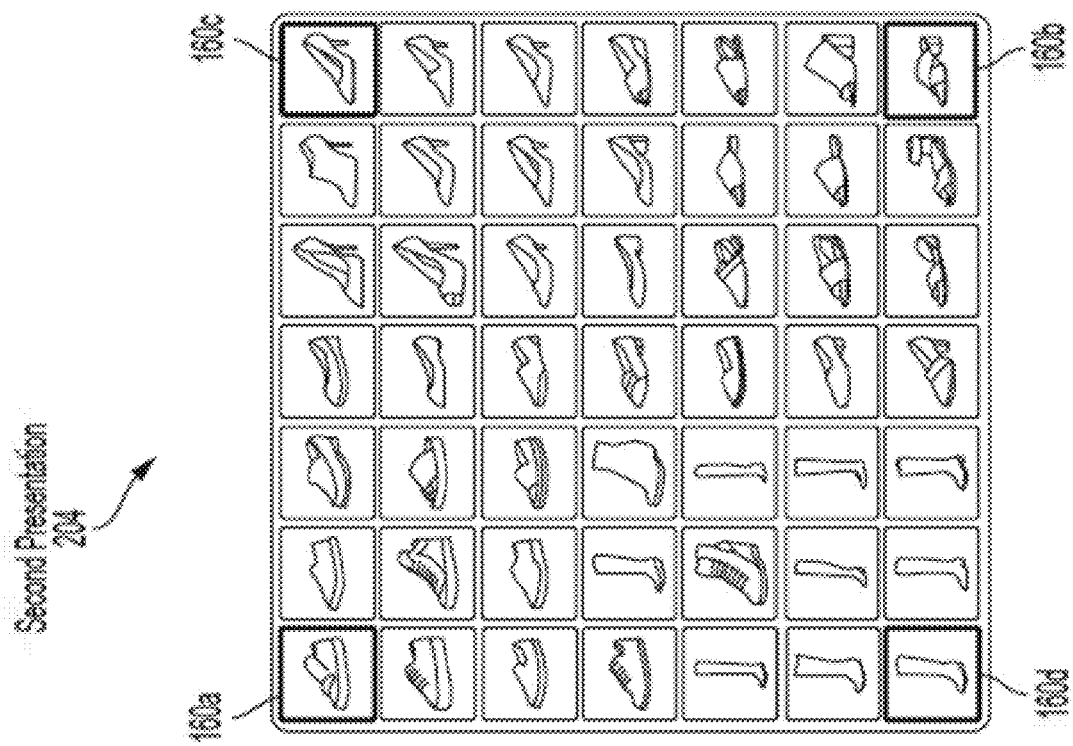
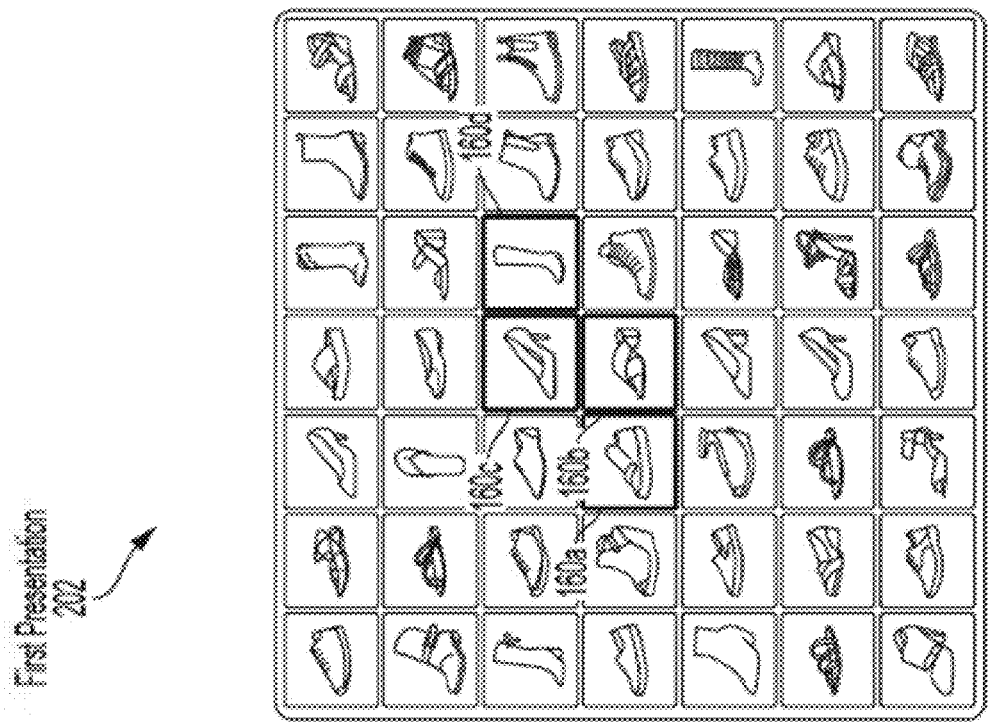
FIG. 2

VISUAL BLENDING OF CONTENT

BACKGROUND

Online content catalogs such as those provided by e-commerce services are often searched using keyword search queries to find content of interest to a user. Various approaches may be used to recommend content to users based on previously purchased and/or previously viewed content. In some examples, users may be able to browse content by selecting an initial content item and then selecting content items that are recommended based on the initial content item, and so on, until a suitable content item is located or until the user abandons the search. In some cases, users may be unaware of the appropriate search terms to use in order to surface a particular product or product feature. Additionally, in some examples, recommendations systems recommend content only based on the currently displayed content.

BRIEF DESCRIPTION OF DRAWINGS

FIG. 2 depicts generation of a visually blended presentation of content, in accordance with various aspects of the present disclosure.

DETAILED DESCRIPTION

Figure 1:
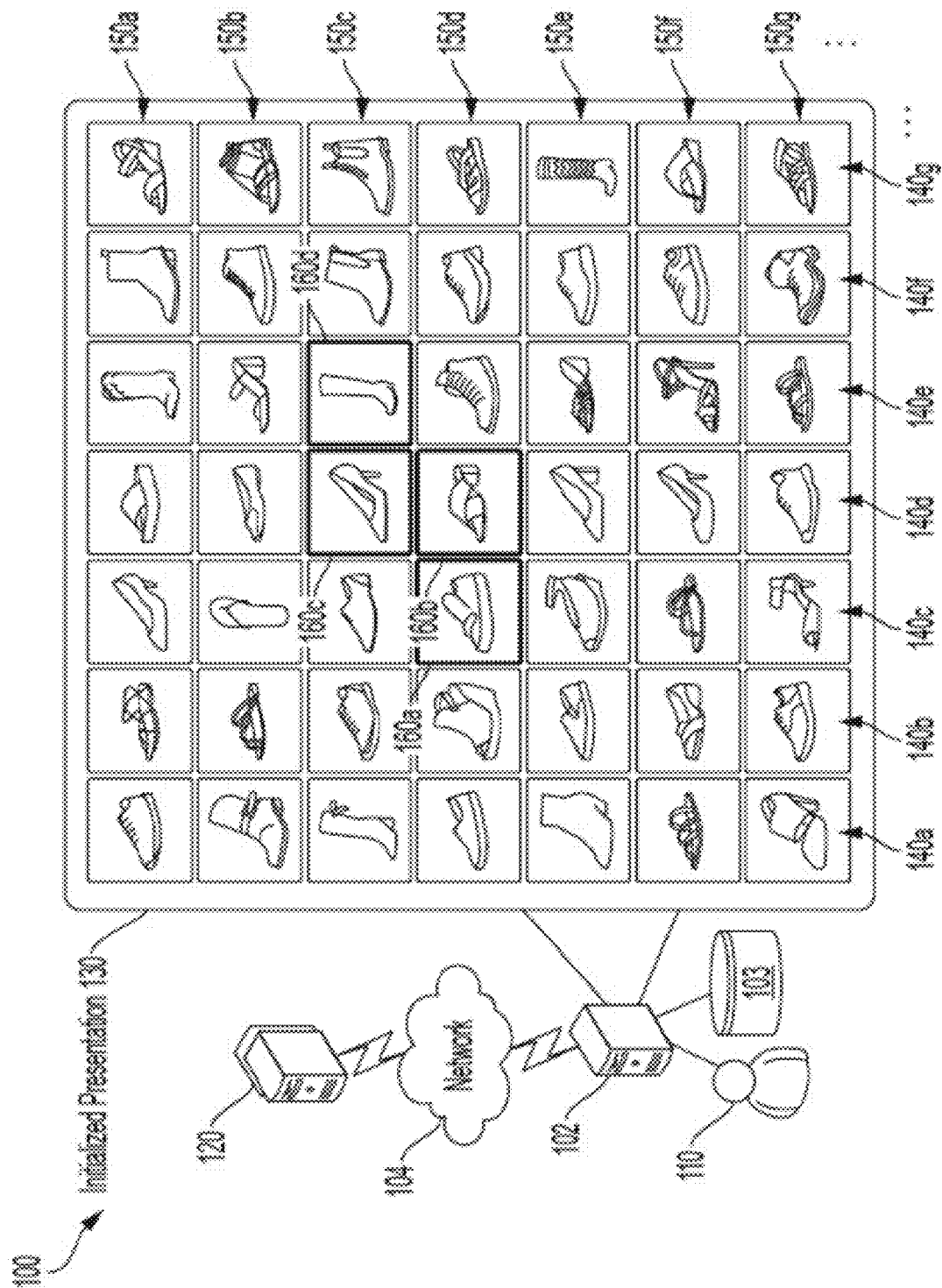
FIG. 1 is a block diagram depicting an example system effective to visually blend content, according to various embodiments of the present disclosure.

In the following description, reference is made to the accompanying drawings that illustrate several examples of the technology described herein. It is understood that other examples may be utilized and various operational changes may be made without departing from the scope of the present disclosure. The following detailed description is not to be taken in a limiting sense, and the scope of the embodiments described herein is defined only by the claims of the issued patent.

Searching for content from large online catalogs of content can be challenging, particularly when the content of interest is largely selected on the basis aesthetic features. For example, fashion, furniture, jewelry, artwork, etc., are often selected on the basis of their appearance, their colors, their materials, and/or other aesthetic attributes. In many cases, a user searching for a particular style of content may not be aware of the pertinent keywords that relate to the features that the user is interested in. For example, a user searching for a particular type of coffee table may not be aware that the style of the coffee table that the user prefers is referred to as a "kidney bean" coffee table, or that the legs of the coffee table that the user prefers are referred to as "hair pin legs." Accordingly, the user may be required to enter the generic search key words "coffee table" into a search field and may need to sift through tens, hundreds, or even thousands of search results in order to locate a suitable coffee table of the preferred style.

In some examples, once a user selects a particular content item, a detail page may be displayed with additional detail concerning the selected item, enlarged images, etc. In various examples, other items may be recommended to the user on the basis of the user's selection of the item on the detail page. However, such recommendations are typically generated based on the detail page item alone, and thus there is a one-to-one correspondence between the currently selected item (the item for which the detail page is shown) and a recommended item.

Described herein are various techniques for recommending several recommendations on the basis of a selection of a variable number of items. Additionally, in various examples described herein, techniques for visually blending and displaying content are described. In at least some of the examples described herein, a user may select from one to four content items and may receive multiple recommendations on the basis of the selected items. Additionally, in various embodiments, the recommended items may be selected and/or displayed in such a way that the items are visually blended along various axes of the display. For example, a user may select a first item—a red leather jacket—and a second item—a black cotton blazer. The red leather jacket and the black cotton blazer may be displayed at two opposite ends of a display with any number of recommended items disposed between the two items (e.g., along a straight line between the two items). Items in the line that are closer to the red leather jacket may be determined as items that are more visually similar to the red leather jacket, while items that are closer to the black cotton blazer may be determined as items that are more visually similar to the black cotton blazer. In various examples, as the line of items between the red leather jacket and the black cotton blazer is visually traversed from the red leather jacket to the black cotton blazer, the items may gradually become less similar to the red leather jacket and more similar to the black cotton blazer.

Although in the above example, a single two-dimensional line of visually blended item images is described, the items may instead be displayed in other presentations. The presentations of content may be displayed in a metric space. A metric space may be any space in which a distance may be determined between various items displayed in the presentation. For example, a Minkowski distance may be determined in the metric space (such as a Euclidean distance for example). Examples of presentations of items in metric space may include display of the content in a grid, display in a three-dimensional cube, display in an irregular shape, display in a circle, etc., without departing from the present disclosure. In various examples, the display of the visually blended items may be associated with a coordinate system so that the distance between any element of the display and any other element of the display can be defined in terms of the coordinate system. The displays of the presentations may be visible to a user so that the user may see one or more content items in the presentation in association with one another. As described in further detail below, the distance in the coordinate system may be used to weight the influence of the input items selected by the user for recommendation (referred to herein as "anchor items") on the current element of the display. In general, items that are farther away from anchor items may be less visually similar to the anchor item, while items that are closer to the anchor item may be more visually similar to the anchor item.

Recommendation "presentations" are described in many of the examples herein. The term "presentation" as used herein refers to a display style depicting content in a metric space whereby distance can be measured between the depictions of the content. In various examples, content items may be displayed along one or more axes between positions in the metric space (e.g., in the presentation). For example, in a grid presentation, items may be displayed in positions that are along a row, column, and/or diagonal of the grid (e.g., along different axes of the grid). Each position of a display (e.g., each element of a grid) may display a single content item. Additionally, each position of a presentation may, in some examples, be defined using coordinates of the metric space such that it is possible to determine relative distances between different positions of the presentation using the coordinate system. It should be noted that the "presentations" described herein need not be rectangular and/or square in shape and can be of any desired shape and/or geometry. In an example embodiment, a presentation may be triangular in shape with anchor items representing the three vertices of the triangle. In another example embodiment, a presentation may be square in shape with anchor items at one or more of the corners. In another example embodiment, a presentation may be circular. In another example embodiment, a presentation may be polygonal. Any desired shapes may be used for the presentation described herein. Additionally, three dimensional recommendation structures may be used. For example, a cube with 4×4×4 elements. In various examples, a three dimensional recommendation structure may comprise multiple planar grids of elements. For example, a 4×4×4 cube may comprise four 4×4 two-dimensional presentations.

In various examples, convolutional neural networks (CNNs) may be used for various image processing tasks such as object recognition, image classification, etc. In various examples, CNNs may learn features (e.g., semantic data representations of attributes of an image) during training. In various examples, the features may be extracted from a pre-trained CNN. In some examples, the features (e.g., feature maps) may be extracted from a relatively late layer of the CNN (e.g., the second-to-last layer of the CNN) in order to provide the most semantically rich feature vectors that represent the input image (and the image's visual attributes). Accordingly, in various examples used herein, extracted features (e.g., feature vectors and/or feature maps) may be used to represent content items in a shared embedding space. In various examples, the feature vectors and/or feature maps may be down-sampled into an embedding vector. Generally, in machine learning, an embedding vector is a mapping of a discrete, categorical variable to a vector of continuous numbers. In neural networks, embeddings are typically of lower dimensions relative to the data that the embeddings represent (e.g., the feature maps and/or the images themselves).

Determining embedding vectors in a shared embedding space provides a way to determine a similarity between various content items. Since the embedding vectors described herein represent images of content items, a visual similarity between images of content items can be determined and visually blended items can be determined and displayed, as described in further detail below.

FIG. 1 is a block diagram depicting an example system 100 effective to visually blend content, according to various embodiments of the present disclosure. In various examples, one or more computing devices 120 may be used to implement the visual blending content recommendation systems and/or techniques described herein. Computing devices 120 may communicate with one another and/or with one or more of the other components depicted in FIG. 1 over a network 104 (e.g., a local area network (LAN) and/or a wide area network (WAN) such as the internet). For example, computing devices 120 may communicate with a non-transitory computer-readable memory 103 over network 104. In various examples, the non-transitory computer-readable memory 103 may store instructions that, when executed by at least one processor of the computing devices 120, may cause the computing devices to perform the various visual blending content recommendation actions described herein.

In various examples, a user 110 may use a computing device 102 (e.g., a mobile device, a laptop, a desktop computer, a wearable device, a human-computer interface, etc.) to access the various visually blended content recommendation presentations described herein. Accordingly, the computing device 102 may include and/or may be configured in communication with a display on which the various visually blended recommendation presentations may be displayed, in accordance with various aspects of the present disclosure.

In the example depicted in FIG. 1, the display associated with computing device 102 may display an initialized presentation 130. In the example, the initialized presentation 130 includes rows of positions 150$a$, 150$b$, 150$c$, 150$d$, 150$e$, 150$f$, and 150$g$ and columns of positions 140$a$, 140$b$, 140$c$, 140$d$, 140$e$, 140$f$, and 140$g$. In the example in which initialized presentation 130 is a grid, the positions defined by the rows and columns may be elements of the grid. However, any number of rows and columns and/or any shape and/or geometrical configuration may be used for initialized presentation 130. In the example, initialized presentation 130, there are seven columns and seven rows with a position at the intersection of each row and column for a total of 49 positions displayed. Additionally, as previously described each position may display a respective item. In the example of FIG. 1, the items are women's shoes; however, any type of item may be displayed in accordance with the particular implementation.

The elements of the initialized presentation 130 may be arranged in a coordinate system such that a distance may be determined between any two positions (e.g., a Euclidean distance) in the metric space. For example, the position at (140$a$, 150$a$) may be a Euclidean distance of 2 away from the position at (140$c$, 150$a$) in the metric space. In another example, the position at (140$d$, 150$d$) may be a Euclidean distance (or other Minkowski distance) of six away from the position at (140$a$, 150$a$).

In an example embodiment, each position of the initialized presentation 130 may be representative of a cluster of similar items in an embedding space. For example, K-means clustering and/or any suitable clustering algorithm may be used to determine K clusters in a particular embedding space. In the example initialized presentation 130 of FIG. 1, since there are 49 positions in the grid, K=49. Visual embeddings representing images of each item in the catalog of interest may be pre-generated (e.g., by extracting features from a pre-trained CNN). Accordingly, each item in the catalog may be associated with an embedding vector (e.g., an "item embedding") that represents (visually) the item. The clustering algorithm may be used to determine a number of clusters for a particular category of item. In the example depicted in FIG. 1, the category may be "women's shoes." However, any category may be selected, in accordance with the desired implementation. The number of clusters may correspond to the number of positions in the grid. In some examples, the category may be determined by a currently selected browse node.

After determining the clusters for the particular category (e.g., for the currently selected category) each cluster may be sampled to determine a particular embedding vector for that cluster. Then, an image of the item associated with the sampled embedding vector may be displayed in the position of the initialized presentation 130. Accordingly, each item displayed in the initialized presentation 130 may be representative of a particular cluster of similar items for the currently selected category of items.

After the initialized presentation 130 is displayed to the user, the user may select items to be used as a basis for recommendation. In the example depicted in FIG. 1, the user has selected items 160a, 160b, 160c, and 160d as indicated by the boxes surrounding these items in the figure. In a two-dimensional rectangular grid example, the user may select up to four items. FIG. 2 depicts generation of a visually blended grid of content that is generated in accordance with selected items 160a, 160b, 160c, and 160d.

In FIG. 2, first presentation 202 represents the initialized presentation 130 of FIG. 1 together with the four user-selected items 160a, 160b, 160c, and 160d, computing device 120 (FIG. 1) may generate a visually blended grid of content (second presentation 204) on the basis of the selected items 160a, 160b, 160c, and 160d. In the second presentation 204, the user-selected items 160a, 160b, 160c, and 160d may be the anchor items and may be positioned at the corner positions of the second presentation 204. As shown in FIG. 2, non-corner positions display items that are more visually similar to the anchor items to which they are closest. Additionally, items are selected for the non-anchor positions in such a way that the items are visually blended along axes of the second presentation 204. For example, items along the first row (from the corner position displaying item 160a to the corner position displaying item 160c) represent a visual blending of items from item 160a to item 160c. In other words, positions in the first row that are closer to item 160a are more visually similar to item 160a. As the first row is traversed position-by-position from item 160a to item 160c, positions display items that are more and more visually similar to item 160c.

Additionally, there is visual blending along all axes of second presentation 204 (e.g., along a diagonal axis between item 160c and item 160d, along the second row of items, along the third column of items, etc.). Various techniques for determining the visually blended items on the basis of the user-selected anchor items (items 160a, 160b, 160c, and 160d in the current example) is described in further detail below. The visual blending along the axes of second presentation 204 may represent a similarity continuum between an item at one end of an axis and the item at the other end of the axis.

As previously discussed, the second presentation 204 comprises a coordinate system that may be used to determine a distance in the coordinate space between any two positions of the second presentation 204. Additionally, each user-selected anchor item is associated with a respective embedding vector that visually represents that anchor item in an embedding space (e.g., item 160a is associated with an embedding vector that represents, for example, a gold-colored low top sneaker). Each position of second presentation 204 that does not include an anchor item (e.g., the non-corner positions in the example depicted in FIG. 2) may display an item that is determined using a weighted average of the anchor items—weighted on the basis of that position's distance from the different anchor items.

First, the distance d between the subject position of second presentation 204 and the position (e.g., the corner positions) of each anchor item i in the second grid to find the distance $d_i$. The unnormalized score $s_i$ (which is in the inverse of the distance $d_i$) may be computed for each anchor item for the subject position as follows:

$$s_i = \frac{1}{d_i} \quad (1)$$

A softmax function may be used to normalize the scores $s_i$ from all anchor items so that the scores sum to 1.

$$\alpha_i = \frac{e^{s_i}}{\sum_j e^{s_j}}, \text{ where } \sum \alpha_i = 1 \quad (2)$$

Accordingly, for the subject non-anchor position, normalized scores $a_i$ are generated for each anchor item. The normalized score $a_i$ for each anchor item is multiplied by the embedding vector visually representing that anchor item ($v_i$) and a weighted sum is determined for each anchor:

$$\sum_i^n v_i \cdot \alpha_i \text{ where } v_i \in \mathbb{R} \quad (3)$$

Accordingly, a weighted sum is determined by summing the weighted value of each anchor item's embedding vector (weighted based on the distance of the current position from the respective anchor item). The weighted sum is an embedding vector. Thereafter, the closest item embedding vector to the weighted sum is determined within the embedding space. The item that is associated with the closest embedding vector to the weighted sum is determined and is displayed in the subject position of second presentation 204. This process is repeated for each other position of second presentation 204 (e.g., each position of second presentation 204 that does not display an anchor item). In various examples, if the recommendation presentation is square (as depicted in the presentation grid in FIG. 2) and only two or three anchor items are selected by the user, items for the remaining "empty" corner positions may be determined using the above-described procedure (e.g., where i=2 or i=3). In an example embodiment, if only a single anchor item is selected, a different procedure may be followed, as described below in reference to FIG. 4.

Figure 3:
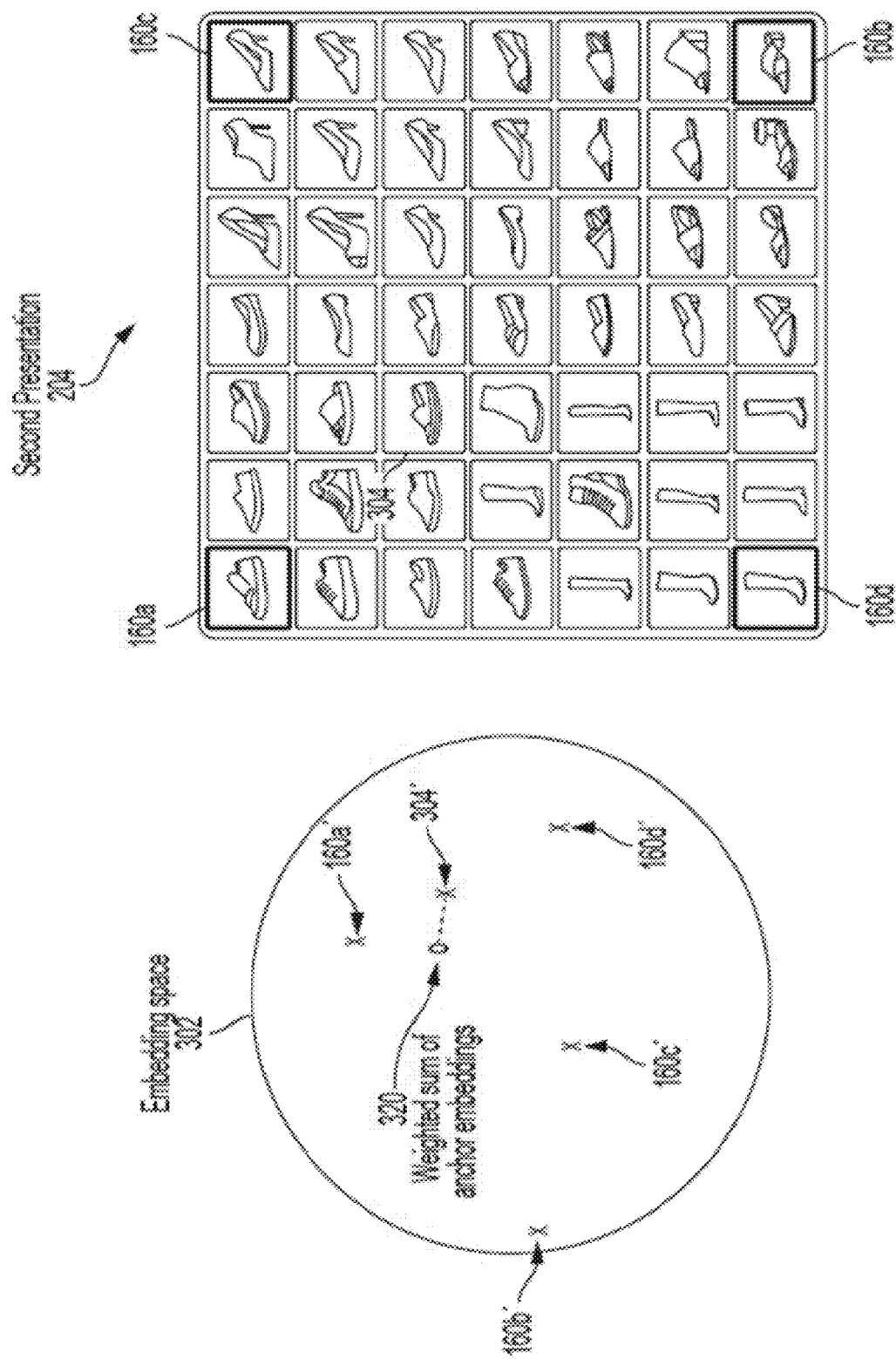
FIG. 3 depicts an example determination of content to be displayed in a visually blended presentation of content, in accordance with various aspects of the present disclosure.

FIG. 3 depicts an example determination of content to be displayed in a visually blended presentation of content, in accordance with various aspects of the present disclosure. In the example depicted in FIG. 3, the second presentation 204 is displayed adjacent to an embedding space 302. Embedding space 302 represents a multi-dimensional vector space for the various embedding vectors used to visually represent items of the particular category of items in second presentation 204 (e.g., women's shoes).

The embedding vector 160a' in embedding space 302 represents the embedding vector for anchor item 160a. Similarly, the embedding vector 160b' in embedding space 302 represents the embedding vector for anchor item 160b, the embedding vector 160c' represents the embedding vector for anchor item 160c, and the embedding vector 160d' represents the embedding vector for anchor item 160d.

As shown, item 304 represents a low top shoe that is displayed in a non-corner position of second presentation 204. Accordingly, in various examples, the item 304 may be determined using the various techniques described above and conceptually described in reference to FIG. 3. As described above, a weighted sum of the anchor embeddings 320 may be determined for the position of the second presentation 204 in which item 304 is displayed. However, it is usually the case that there is no item associated with the exact weighted sum computed using equations (1)-(3) above. Accordingly, the closest embedding vector to the weighted sum of anchor embeddings 320 may be determined in the embedding space 302. In the current example, the closest embedding vector is the embedding vector 304'. The embedding vector 304' may visually represent the low top shoe (item 304). Accordingly, item 304 may be selected for display in the subject position. This process may be repeated to determine the appropriate item to display in non-anchor position of the second presentation 204. Additionally, this procedure results in a visual blending along each axis of second presentation 204. Notably, the blending is smooth in the embedding space due to the normalized weighted averages described above. However, because there is typically not an embedding vector of an item that matches the weighted sum that is computed, the visual transition between adjacent items displayed in the second presentation 204 may sometimes be abrupt depending on the distance between the computed embedding vector and the actual item's embedding vector in the embedding space 302.

Figure 4:
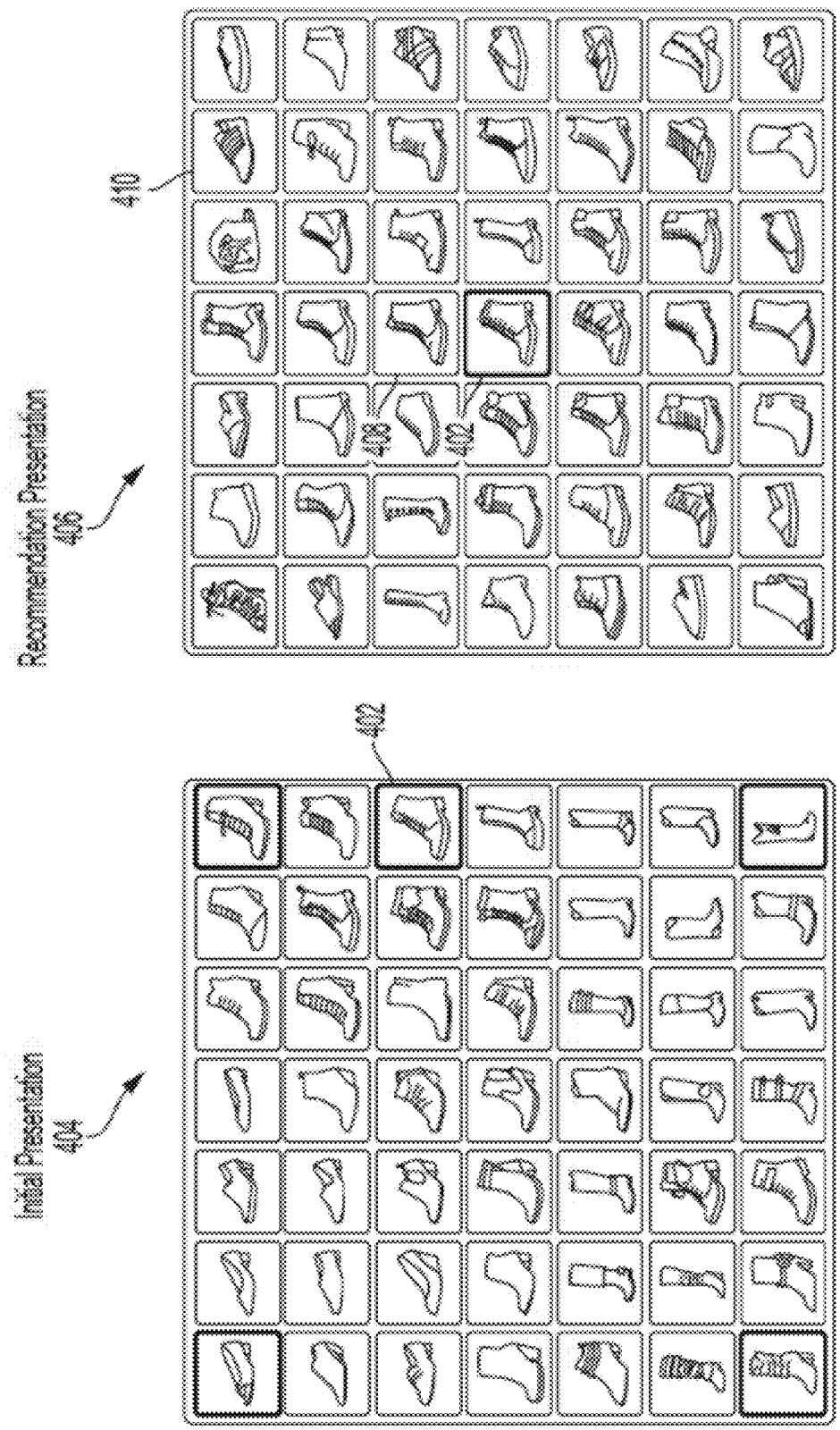
FIG. 4 depicts determination of content to be displayed in a visually blended presentation of content based on a single anchor item, in accordance with various aspects of the present disclosure.

FIG. 4 depicts determination of content to be displayed in a visually blended presentation of content based on a single anchor item 402, in accordance with various aspects of the present disclosure. In the example depicted in FIG. 4, an initial presentation 404 is displayed. Initial presentations (e.g., initial presentation 404, initial presentation 130 (FIG. 1)) may be displayed for various reasons. In some examples, a widget and/or application may display the presentations. In another example, instead of recommending single items based only on the currently viewed item, an initial recommendation presentation (e.g., initial presentation 404) may be displayed.

In any event, in some example embodiments, a single item may be selected as an anchor item, and the user may elect to have a recommendation presentation (e.g., a visually blended recommendation presentation, such as recommendation presentation 406) generated based on a single item. In the example depicted in FIG. 4, item 402 represents a single item selected by a user for use as an anchor item to generate recommendation presentation 406. In an example embodiment, the selected anchor item 402 may be displayed at the center of the recommendation presentation 406.

In the case of a single anchor item, the non-anchor item positions of the recommendation presentation may be populated in a different way. In various examples, a clustering technique may be used to cluster item embedding vectors in the embedding space for the particular category of item (e.g., women's shoes). Thereafter, quantization may be used to separate the item embedding vectors into a number of quantization bins. The number of quantization bins may be selected, for example, based on the size of the recommendation presentation 406. The maximum Euclidean distance from the center position of the recommendation presentation 406 (in which item 402 is displayed) is six. Accordingly, in an example, six quantization bins may be selected. Thereafter, for each non-anchor position of the recommendation presentation 406 (e.g., each non-central position of the presentation) a random item may be sampled from the quantization bin that corresponds to the Euclidean distance of the presentation position being populated.

For example, item 408 is a Euclidean distance of one from anchor item 402 in the recommendation presentation 406. Accordingly, the item 408 displayed may be sampled from among items in the quantization bin that is the closest to the embedding vector of the anchor item 402. In another example, item 410 is a Euclidean distance of five from the anchor item 402 in the recommendation presentation 406. Accordingly, the item 410 displayed may be sampled from among items in the quantization bin that is the fifth furthest away from the embedding vector of the anchor item 402. The maximum and minimum distance in the embedding space that defines a quantization bin may be adjustable to increase and/or decrease variation from the anchor item. In some cases, a user may be able to select an amount of preferred variation on a graphical control position of a user interface. Increasing the amount of variation may increase the size of the quantization bin (e.g., by increasing the maximum distance from the anchor embedding for the bin).

Figure 5:
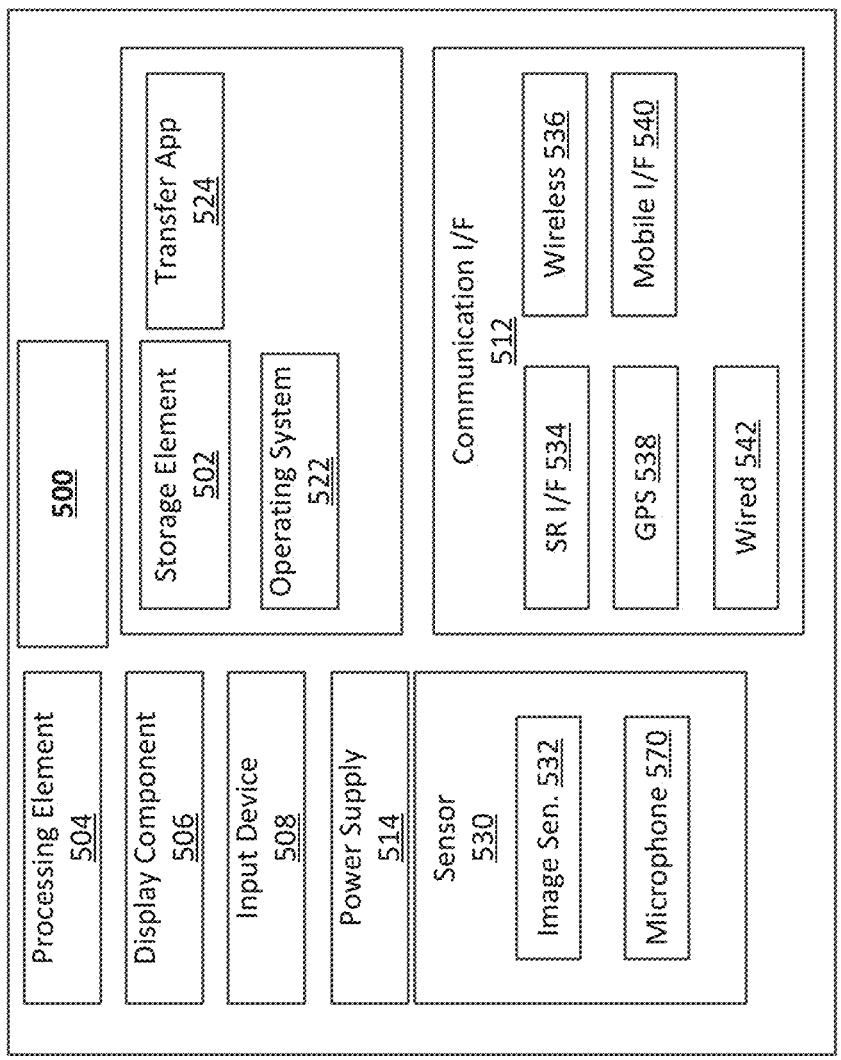
FIG. 5 is a block diagram showing an example architecture of a computing device that may be used in accordance with various aspects of the present disclosure.

FIG. 5 is a block diagram showing an example architecture 500 of a computing device that may be used to generate the recommendation grids described herein, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store parameters, and/or machine learning models used for the various techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more lightemitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display the various fields and/or GUIs described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing devices, as described herein, are exemplary, and may be located as a stand-alone device or may be included, in whole or in part, as a component of a larger device or system.

Figure 6:
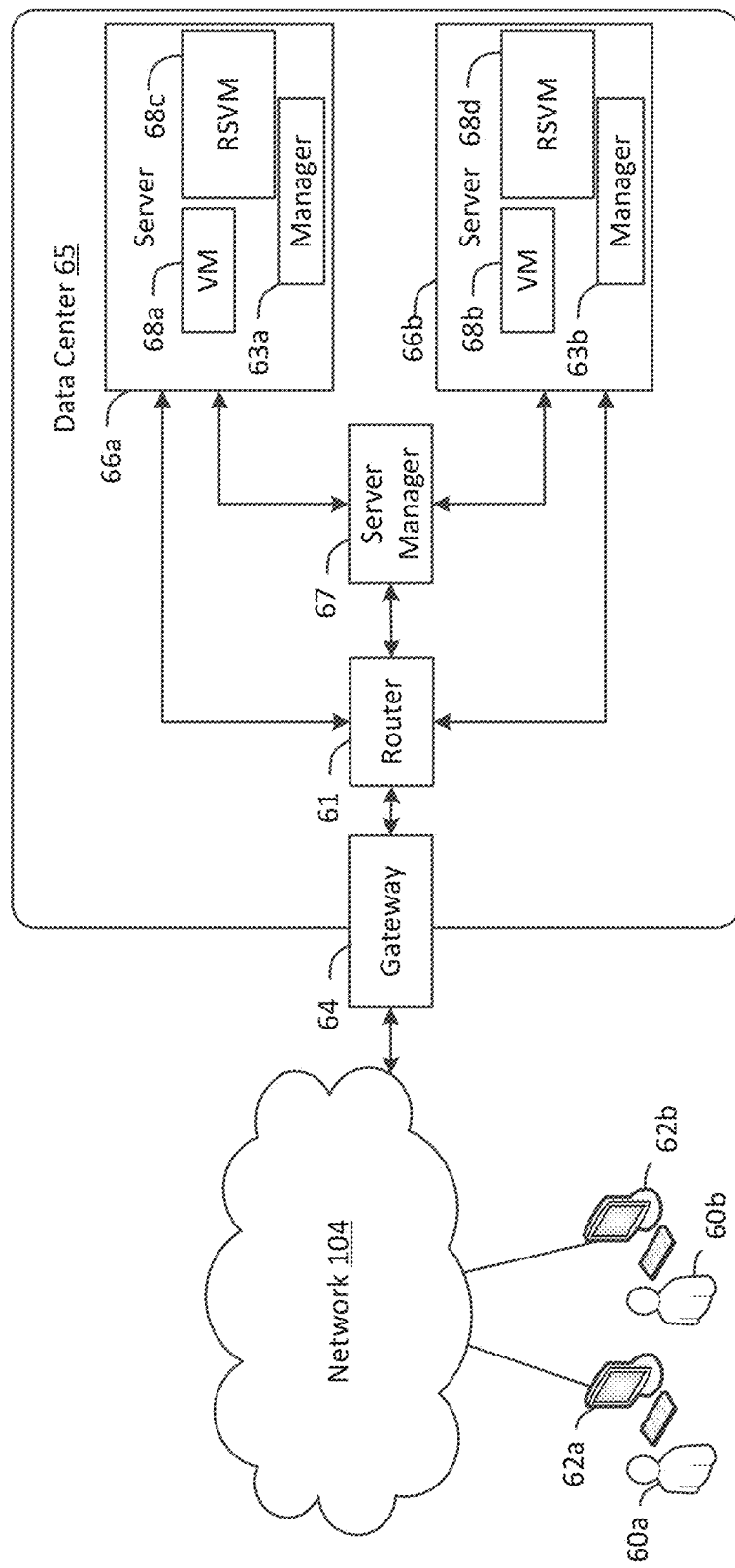
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. For example, the computing environment of FIG. 6 may be used to provide the various visually blended content recommendations described herein as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60*a* and 60*b* (which may be referred herein singularly as user 60 or in the plural as users 60) via user computers 62*a* and 62*b* (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. In various examples, the instances may be configured to execute one or more of the various machine learning techniques described herein.

These services may be configurable with set or custom applications and may be configurable in size, execution, cost, latency, type, duration, accessibility, and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large-scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box, or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed, at least in part, to direct various communications to, from, and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

Figure 7:
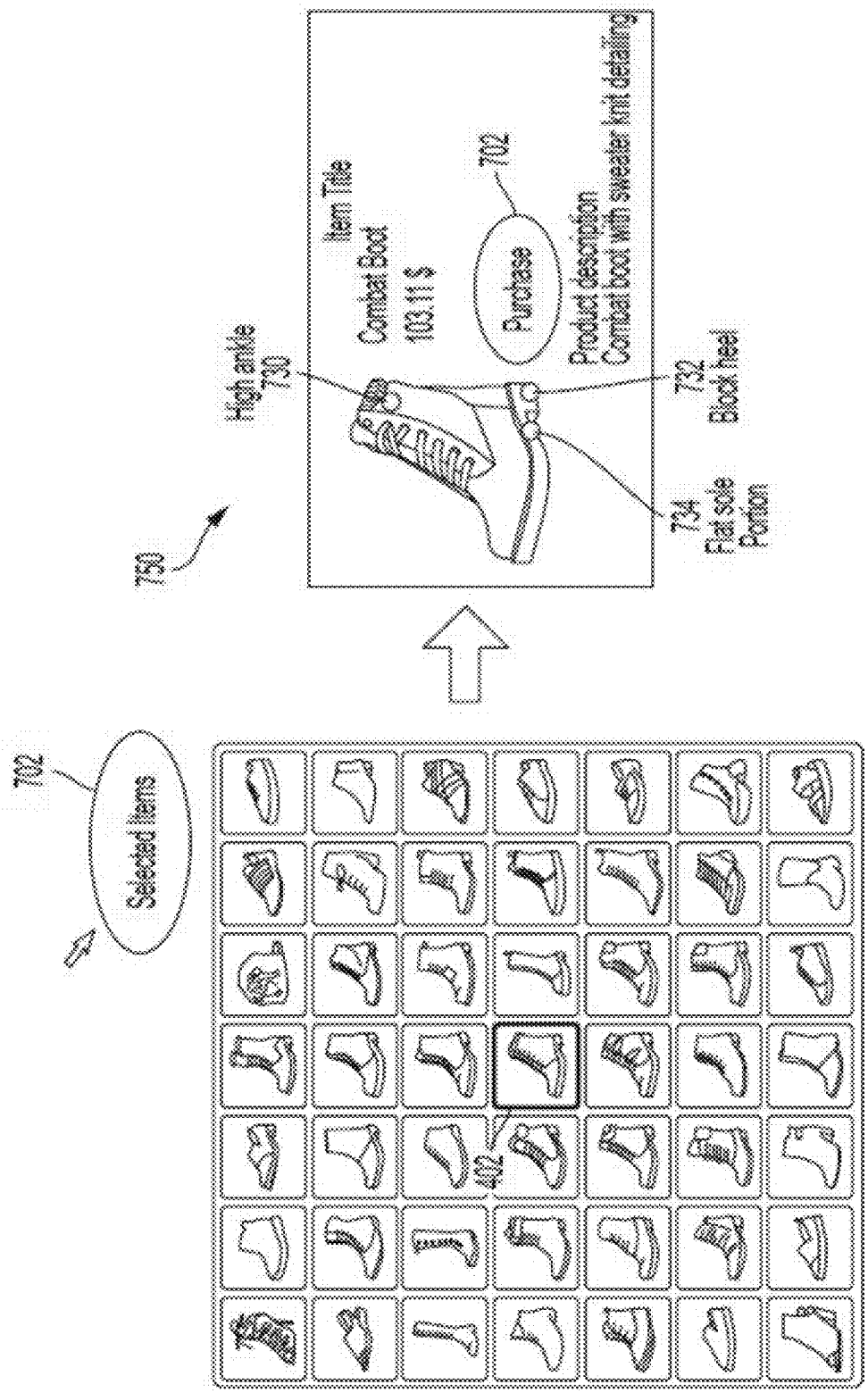
FIG. 7 depicts display of additional detail including visually detected features of a selected content item, according to various aspects of the present disclosure.

FIG. 7 depicts display of additional detail including visually detected features of a selected content item, according to various aspects of the present disclosure. In various examples, a graphical control button may be displayed on the user interface in association with the recommendation presentation. For example, selected items 702 may be a graphical control used to display additional information concerning items selected by the user from the recommendation presentation.

In the example depicted in FIG. 7, the user has selected item 402 (a black combat boot). The user may then select the select items 702 graphical control. Accordingly, in response to selection of the select items 702 graphical control, the detail page 750 (e.g., an item detail page) may be displayed to the user to show additional detail regarding the selected item. In the example of the detail page 750 shown in FIG. 7, an item title of the selected item, an enlarged image, a detailed product description, a price, and another graphical control 720 effective to allow the user to purchase the item are displayed. However, it may be appreciated that additional or less information may be displayed in accordance with the desired implementation. Additionally, visual features detected by inputting the image of the selected item into a CNN may be displayed. For example, the same CNN that is used to extract the item embedding vectors (e.g., vectors representing feature maps of the item images) may be used to extract visual features. In the example shown in FIG. 7, the visual features "high ankle" (730), "flat sole portion" (734), "block heel" (732) are displayed. In some example embodiments, the portions of the image corresponding to the visual features may be marked (e.g., the small circles depicted on the boot in FIG. 7). In some example implementations, the user may select the markings for the visual features to receive additional information about the visual features (e.g., such as a description of the visual feature, an enlarged image of the visual feature, etc.).

Figure 8:
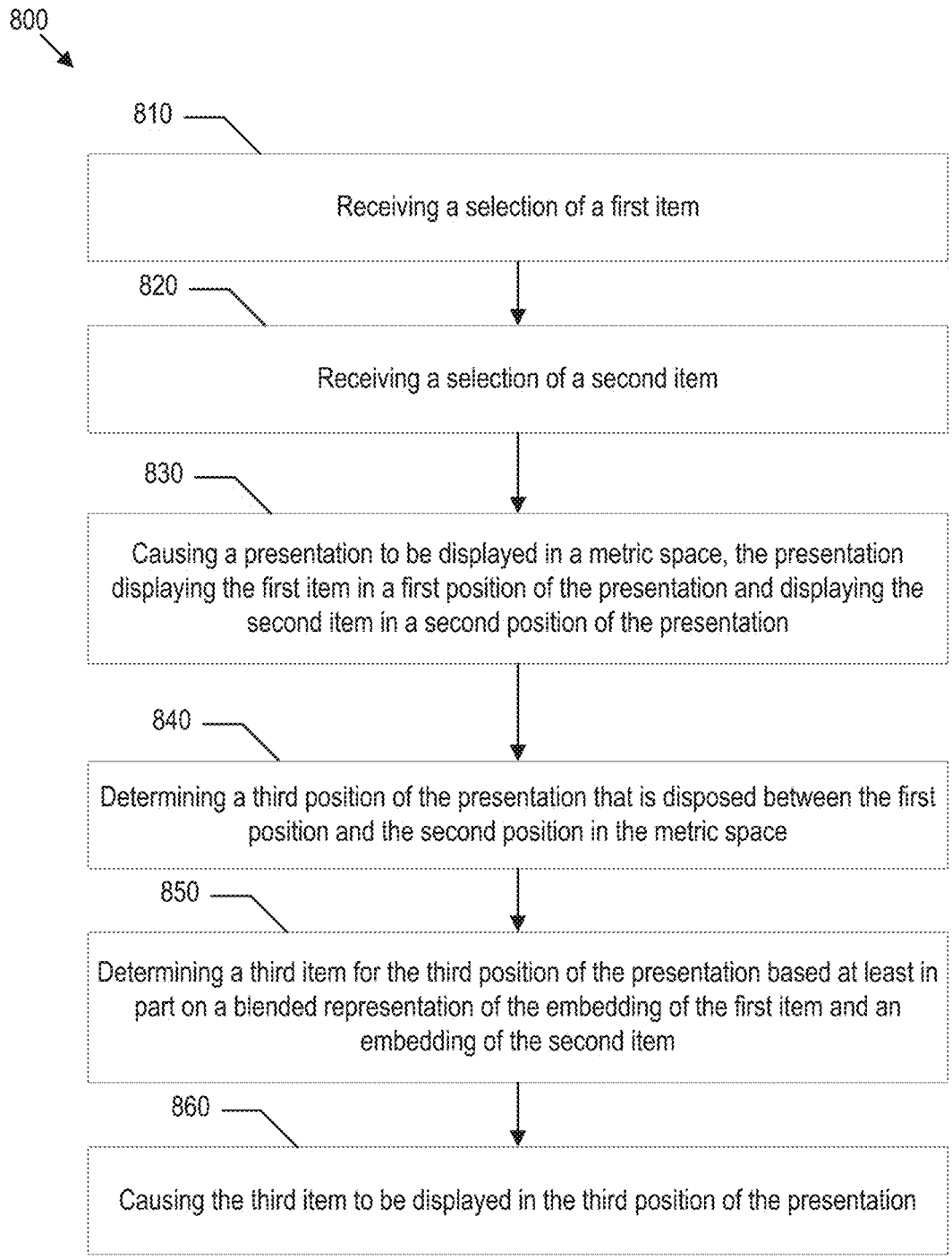
FIG. 8 is a flow chart illustrating an example process for displaying a visually blended presentation of content, in accordance with various aspects of the present disclosure.

FIG. 8 is a flow chart illustrating an example process 800 for displaying a visually blended presentation of content, in accordance with various aspects of the present disclosure. Those actions in FIG. 8 that have been previously described in reference to FIGS. 1-7 may not be described again herein for purposes of clarity and brevity. The actions of the process depicted in the flow diagram of FIG. 8 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 800 may begin at action 810 where a selection of a first item displayed in a presentation of items (e.g., a initial grid of displayed items) may be received. The presentation may be in a metric space so that distances between different positions in the metric space (e.g., positions where items are displayed) can be determined.

Processing may continue to action 820, at which a selection of a second item may be received. The second item may be selected from the same presentation of items as the first item or from a different presentation of items.

Processing may continue to action 830, at which a recommendation presentation may be displayed in a metric space. The recommendation presentation may display the first selected item in a first position of the presentation and the second selected item in a second position of the presentation. In various examples, the recommendation presentation may be used to recommend items to a user. For example, second presentation 204 (FIGS. 2 and 3) and recommendation presentation 406 (FIG. 4) may be examples of recommendation presentations.

Processing may continue to action 840, at which a third position of the presentation that is disposed between the first position and the second position in the metric space may be determined. For example, if the first position (displaying the first selected item) is in the bottom left corner of a grid and the second position (displaying the second selected item) is in the bottom right corner of the grid, the third position may be an element of the grid in the bottom row between the bottom left corner and the bottom right corner.

Processing may continue to action 850, at which a third item may be determined for display at the third position in the recommendation presentation. The third item may be determined based at least in part on a blended representation of the embedding of the first item and an embedding of the second item. The blended representation may be determined as described above in reference to FIG. 2. Processing may continue to action 860, at which the third item may be displayed in the third position of the recommendation presentation.

Although various systems described herein may be embodied in software or code executed by general-purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method of displaying content, comprising:
    displaying a first grid comprising a plurality of positions arranged in a first coordinate system;
    displaying a first plurality of items, wherein each position of the first grid includes a respective item of the first plurality of items;
    receiving a selection of a first item and a second item of the first plurality of items;
    displaying the first item at a first corner position of the first grid;
    displaying the second item at a second corner position of the first grid;
    determining, for a non-corner position in the first grid, a first Euclidean distance between the non-corner position and the first corner position;
    determining, for the non-corner position in the first grid, a second Euclidean distance between the non-corner position and the second corner position;
    determining a first embedding vector representing the first item in an embedding space;
    determining a second embedding vector representing the second item in the embedding space;
    determining an inverse of the first Euclidean distance;
    determining an inverse of the second Euclidean distance;
    determining a first weighted value based on multiplying the inverse of the first Euclidean distance by the first embedding vector;
    determining a second weighted value based on multiplying the inverse of the second Euclidean distance by the second embedding vector;
    generating a weighted sum for the non-corner position in the first grid by adding the first weighted value and the second weighted value;
    determining a closest embedding vector in the embedding space to the weighted sum;
    determining a third item that is associated with the closest embedding vector; and
    displaying the third item in the non-corner position of the first grid.

2. The method of claim 1, further comprising:
    receiving a selection of a graphical control position; and
    displaying, in response to the selection of the graphical control position, an item detail page comprising:
        a description of the first item;
        one or more visual attributes associated with the first item;
        a description of the second item; and
        one or more visual attributes associated with the second item.

3. The method of claim 1, further comprising:
    receiving a selection of the third item;
    receiving a selection of a graphical control configured to generate recommendations based on the third item;
    displaying a second grid, wherein an image of the third item is displayed in a center position of the second grid;
    determining, for an position of the second grid, a Euclidean distance from the center position of the second grid;
    determining a set of items associated with the Euclidean distance;
    sampling a fourth item from the set of items; and
    displaying the fourth item in the position of the second grid.

4. A method comprising:
    receiving a selection of a first item displayed on a display;
    receiving a selection of a second item displayed on a display;
    determining a first category associated with the first item and the second item;

determining, using a clustering algorithm, a number of clusters of items of the first category in an embedding space, wherein the number of clusters corresponds to a number of positions in a presentation;
generating first code, that when executed, is configured to cause the presentation to be displayed in a metric space, the presentation displaying the first item in a first position in the presentation and displaying the second item in a second position of the presentation, wherein each position of the presentation corresponds to a respective one of the clusters;
determining a third position of the presentation that is disposed between the first position and the second position in the metric space;
determining a third item for the third position of the presentation based at least in part on a blended representation of an embedding of the first item and an embedding of the second item; and
causing the third item to be displayed in the third position of the presentation.

5. The method of claim 4, further comprising:
determining a first distance between the first position and the third position in the metric space; and
determining a second distance between the second position and the third position in the metric space, and wherein the blended representation is generated based at least in part on the first distance and the second distance.

6. The method of claim 5, further comprising:
determining a first product of the embedding of the first item and an inverse of the first distance; and
determining a second product of the embedding of the second item and an inverse of the second distance.

7. The method of claim 6, further comprising:
determining a sum of the first product and the second product, wherein the blended representation corresponds to the sum of the first product and the second product; and
determining a closest embedding in an embedding space to the sum of the first product and the second product.

8. The method of claim 7, further comprising determining that the third item corresponds to the closest embedding in the embedding space.

9. The method of claim 4, further comprising:
receiving a selection of a graphical control element; and
generating second code, in response to the selection of the graphical control element, the second code configured to cause an item detail page to be displayed, the item detail page comprising:
a description of the first item;
one or more visual attributes associated with the first item;
a description of the second item; and
one or more visual attributes associated with the second item.

10. The method of claim 4, wherein items displayed along an axis of the metric space in the presentation represent a similarity continuum from a first end of the axis to a second end of the axis.

11. The method of claim 4, wherein the presentation comprises a grid, and wherein the first position represents a first corner element of the grid and the second position represents a second corner element of the grid.

12. A method comprising:
determining a first category of items; and
determining, using a clustering algorithm, a number of clusters of items of the first category of items in an embedding space, wherein the number of clusters corresponds to a number of positions in a first presentation;
generating first code that, when executed, is configured to cause a first plurality of items arranged in the first presentation to be displayed, wherein each item of the first plurality of items corresponds to a respective one of the clusters;
receiving a selection of a first item from among the first plurality of items;
generating second code that, when executed, is configured to cause the first item to be displayed in a first position of a second presentation, wherein the second presentation represents a metric space;
determining, for a second position of the second presentation, a first distance between the first position and the second position in the metric space;
determining a first embedding vector for the first item;
determining a second item for the second position based at least in part on the first embedding vector and the first distance; and
generating third code that, when executed, is configured to cause the second item to be displayed in the second position of the second presentation.

13. The method of claim 12, further comprising:
receiving a selection of a third item from among the first plurality of items in the first presentation; and
generating fourth code that, when executed, is configured to cause the third item to be displayed in a corner position of the second presentation.

14. The method of claim 13, further comprising:
determining a second embedding vector for the third item;
determining, for a third position of the second presentation, a distance between the third position and the first position in the metric space;
determining, for the third position of the second presentation, a distance between the third position and the second position in the metric space;
determining a weighted average of the first embedding vector and the second embedding vector;
determining a fourth item for the third position based at least in part on the weighted average; and
generating fifth code that, when executed, is configured to cause the fourth item to be displayed in the third position.

15. The method of claim 14, wherein the weighted average is weighted based on the distance between the third position and the second position in the metric space and based on the distance between the third position and the first position in the metric space.

16. The method of claim 12, wherein the first position of the second presentation is a center element of the second presentation in the metric space, the method further comprising:
determining that the first distance corresponds to a first bin of item embeddings;
sampling an item embedding from among the item embeddings in the first bin; and
determining that the item embedding corresponds to the second item.

17. The method of claim 12, further comprising:
receiving a selection of a graphical control element; and
generating fourth code in response to the selection of the graphical control element, wherein the fourth code, when executed, is configured to cause an item detail page to be displayed, the item detail page comprising:
a description of the first item;

one or more visual attributes associated with the first item;
a description of the second item; and
one or more visual attributes associated with the second item.

18. The method of claim 12, wherein the second presentation comprises a grid, wherein items displayed along a first axis of the grid represent a similarity continuum from a first end of the first axis to a second end of the first axis.

19. The method of claim 12, further comprising:
generating fourth code that, when executed, is configured to cause user-selected items to be displayed at corner positions of the second presentation, wherein a third item selected for display in a non-corner position of the second presentation is determined based at least in part on respective distances between the non-corner position and the user-selected items at the corner positions of the second presentation in the metric space.

20. A method comprising:
generating first code that, when executed, is configured to cause a first plurality of items arranged in a first presentation to be displayed;
receiving a selection of a first item from among the first plurality of items;
generating second code that, when executed, is configured to cause the first item to be displayed in a first position of a second presentation, wherein the second presentation represents a metric space, and wherein the first position of the second presentation is a center element of the second presentation in the metric space;
determining, for a second position of the second presentation, a first distance between the first position and the second position in the metric space;
determining a first embedding vector for the first item;
determining that the first distance corresponds to a first bin of item embeddings;
sampling an item embedding from among the item embeddings in the first bin;
determining that the item embedding corresponds to a second item; and
generating third code that, when executed, is configured to cause the second item to be displayed in the second position of the second presentation.

* * * * *